United States Patent [19]

Maeda et al.

[11] Patent Number: 4,629,371
[45] Date of Patent: Dec. 16, 1986

[54] THROW-AWAY INSERT

[75] Inventors: Jun Maeda; Yoshikatsu Mori, both of Itami, Japan

[73] Assignee: Sumitomo Electric Industries, Ltd., Osaka, Japan

[21] Appl. No.: 725,210

[22] Filed: Apr. 19, 1985

[30] Foreign Application Priority Data

May 7, 1984 [JP] Japan .............................. 59-66815[U]

[51] Int. Cl.⁴ ............................................. B26D 1/00
[52] U.S. Cl. .................................................. 407/114
[58] Field of Search ........................ 407/114, 115, 116

[56] References Cited

U.S. PATENT DOCUMENTS 3,383,748  5/1968  Galimberti et al. .
4,335,984  6/1982  Zweekly ............................... 407/114
4,411,565  10/1983  Hazra et al. .......................... 407/114

FOREIGN PATENT DOCUMENTS 3148535  7/1983  Fed. Rep. of Germany ...... 407/114
98885  7/1977  Japan ................................... 407/114
33924  7/1982  Japan .
1105  1/1984  Japan ................................... 407/114

Primary Examiner—Leonidas Vlachos
Attorney, Agent, or Firm—W. G. Fasse; D. H. Kane, Jr.

[57] ABSTRACT

A throw-away insert has a cutting edge (12) along its outer periphery and between adjacent noses (11). A concave rake surface (8) is formed which extends directly form the cutting edges (12) toward the center of the insert. A plurality of bosses (10) and a plurality of projections (9) are spaced a predetermined distance from the cutting edges (12) and extend above the rake surface (8). A plurality of lands (5) which are spaced at predetermined intervals (16) from each other are located along the cutting edge (12) and on the rake surface (8).

5 Claims, 8 Drawing Figures

SCM415 HB160
INSERT:TNMG432
CONDITION:V=150 m/minute

THROW-AWAY INSERT

BACKGROUND OF THE INVENTION

1. Field of the Invention

This invention relates to a throw-away insert wherein cutting edges and their sides associated with the rake surface are improved.

2. Description of the Prior Art

FIG. 1 is a top view of an example of a conventional throw-away insert as disclosed, e.g., in U.S. Pat. No. 3,383,748, having a groove of given cross-section formed along all cutting edges, with a land 1 of given width interposed therebetween.

In the throw-away insert shown in FIG. 1, the cross-sectional shape is constant along the cutting edges. Thus, in certain types of cutting, such as profile cutting, where the depth of the cut varies, there has been a problem because satisfactory disposal of chips is impossible. Accordingly, the use of the throw-away insert in an unmanned machining tool has encountered difficulties.

FIG. 2 is a top view of another example of a throw-away insert which has heretofore been used in profile cutting as disclosed, e.g., in Japanese utility model publication No. 33924/1982 (unexamined) showing an insert having raised portions 3 disposed at suitable locations on the rake surface.

The throw-away insert shown in FIG. 2, unlike the one shown in FIG. 1, has its cross-sectional shape varied along the cutting edges. Therefore, under various cutting condition, disposal of chips can be smoothly effected. However, when the insert is clamped to a tool holder, the support surfaces, indicated hatching in FIG. 2, are small, and hence, in profile cutting where the depth of the cut varies, there has been a problem that the insert is liable to break.

SUMMARY OF THE INVENTION

Accordingly it is an object of this invention to provide a throw-away insert which ensures a satisfactory chip disposal and a long tool life.

In a broad aspect of the invention, there is provided a throw-away insert comprising a cutting edge formed along the outer periphery and between adjacent noses, a concave rake surface extending from the cutting edges to the center of the insert, one or more raised portions formed around the center so as not to contact the cutting edges, and a plurality of lands disposed along the cutting edges and on the rake surface and spaced a predetermined distance from each other.

Thus, in this invention, since portions where lands are formed alternate with other portions where no lands are formed, along the cuting edges, the chip disposal function in profile cutting is improved. Further, the strength of the throw-away insert is also increased; thus, a throw-away insert having a long useful life can be obtained.

In a particular aspect of the invention, the rake surface has an arcuate shape in cross-section as seen at right angles to the cutting edge and the lands are so formed that the tangent angle at the intersection between said arc and the land varies along the length of the cutting edge.

Further, the lands are so formed that the width of the land varies along the length of the cutting edge.

The tangent angle with respect to said arc in the land may be made greater than the tangent angle at portions where no lands are formed.

Preferably, one or more lands are symmetrical with respect to a perpendicular line drawn from the insert center to a cutting edge which is formed with said lands.

Further, the ridges formed on the rake surface preferably include one or more boss portions formed around the insert center and one or more raised portions spaced a predetermined distance from a cutting edge.

These object and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
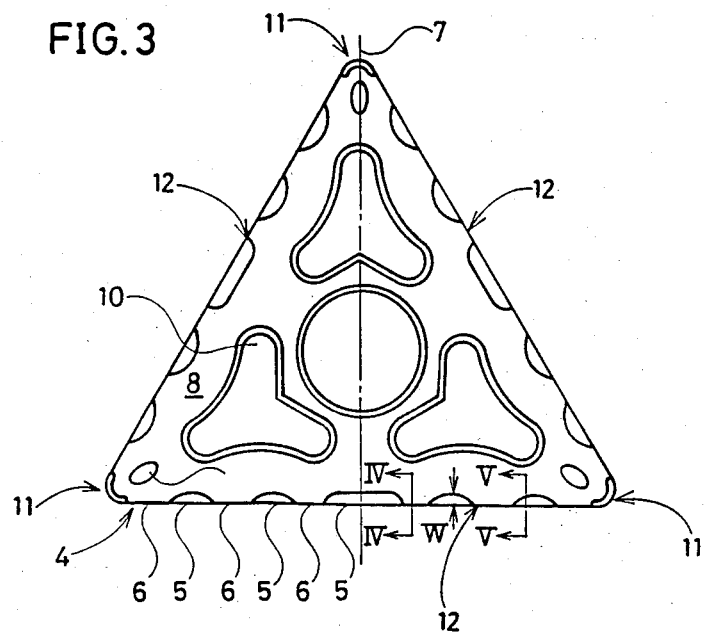
FIG. 3 is a top view of a throw-away insert according to an embodiment of this invention.

The insert of FIG. 3 has cutting sides 4 with portions where lands 5 are formed between intervals 6 where lands are not formed, these lands 5 and intervals 6 are disposed symmetrically with respect to a centerline 7, whereby the lands 5 are interrupted by the intervals 6 along a cutting edge 12. The length of the lands 5 is preferably about 1.0–3.0 mm at the nose portions and the length of other lands 5 away from the nose portions is also preferably within a range of 1.0–3.0 mm, these dimensions being determined according to conditions under which such throw-away inserts are commonly used. For example, for a triangular insert with an inscribed circle having a diameter of 12.7 mm, the length of the lands at the nose portions are suitably 2 mm long and other lands are also 2 mm long.

Figure 4:
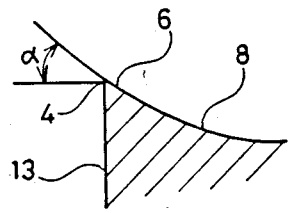
FIG. 4 is a sectional view taken along the line IV—IV in FIG. 3.
Figure 5:
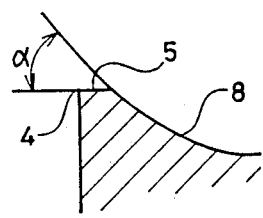
FIG. 5 is a sectional view taken along the line V—V in FIG. 3.

The rake surface 8, as shown in FIGS. 4 and 5, is so formed that its cross-sectional shape is arcuate, and its tangent angle $\alpha$ is large where lands 5 are formed and small at portions 6 where lands 5 are not formed. The tangent angle $\alpha$ referred to herein means an angle formed between a tangent to the intersection of the arc and land and a straight line perpendicular to the surface 13 in FIG. 4. In the portions where the lands 5 are formed, the tangent angle $\alpha$ is preferably in the range of 20°–30°, while in the intervals 6 where lands are not formed the angle is preferably in the range of 10°–25°. Disposed on the rake surface 8 are projections 9 and bosses 10 in the middle of the rake surface 8.

Figure 1:
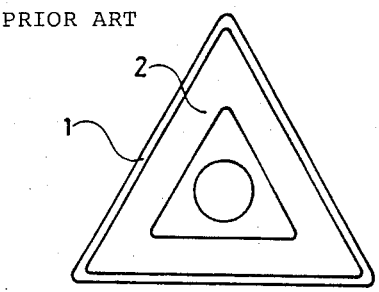
FIG. 1 is a top view of an example of a conventional throw-away insert.
Figure 2:
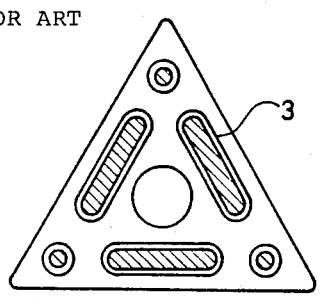
FIG. 2 is a top view of another example of a conventional throw-away insert.
Figure 6:
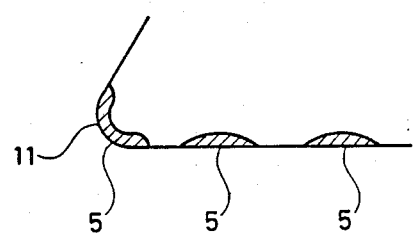
FIG. 6 is a sectional view showing the principal portion of FIG. 3 on an enlarged scale.

According to the throw-away insert arranged in the manner described above, chips produced during cutting only come in contact with the lands 5 hatched in FIG. 6. Thus, as compared to a conventional throw-away insert with lands having a fixed width, the area of chip contact is small and hence the cutting resistance is reduced. The results of tests using the throw-away insert of the present embodiment and of the conventional throw-away insert shown in FIG. 1 indicated that the cutting force of the throw-away insert of the present embodiment was reduced by about 15%. The test conditions were: workpiece material, SCM 440, $H_B$ 250; cutting speed, 150 m/min; feed rate, 0.3 mm/rev; and depth cut, 5 mm.

Figure 7:
FIG. 7 is a sectional view illustrating a chip produced by the throw-away insert of the embodiment shown in FIG. 3.
Figure 8:
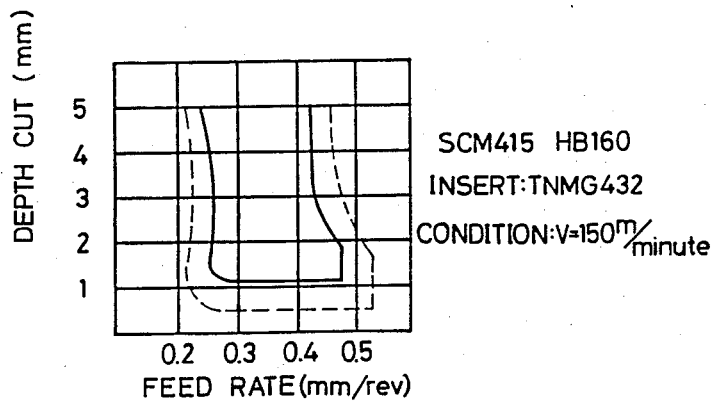
FIG. 8 is a view showing the chip disposal effects of the throw-away insert of the embodiment shown in FIG. 3 and of a conventional throw-away insert.

FIG. 7 shows the cross-section of a chip produced by the throw-away insert of the present embodiment. As shown, the chip receives great strains at locations where lands 5 are formed, and the apparent thickness t is increased. As the chip hits the inclined surface of the projection 9 or boss 10, the chip can be easily broken, so that satisfactory chip disposal is attained. FIG. 8 is a graph showing chip disposal effects determined by making a comparative test of the throw-away insert of the present embodiment and the conventional throw-away insert shown in FIG. 1, wherein the solid and broken lines indicate chip disposal capability regions of the conventional and present cases, respectively. The test condition were: the workpiece material, SCM 415, $H_B$ 160; and the cutting speed, 150 m/min.

In the portions where lands 5 are formed in the present embodiment, the width W of the lands 5 changes continuously within the range of 0–0.4 mm and the tangent angle is greatest where the land width is greatest and is smallest where the land width is smallest, i.e., zero. This setting makes it possible to prevent a reduction in the cutting edge strength where the land width is small and to maintain the sharpness of the insert even where the land width is large.

Although the present invention has been described and illustrated in detail, it is clearly understood that the same is by way of illustration and example only and is not to be taken by way of limitation, the scope of the present invention being limited only by the terms of the appended claims.

What is claimed is:

1. A throw-away insert comprising an insert body having noses and an outer periphery, a cutting edge formed along said outer periphery and between adjacent noses of said insert body, a concave rake surface (8) extending from said cutting edges toward the center of said insert body, a plurality of raised portions formed on said rake surface and nearer to the center so that they do not contact the cutting edges, and a plurality of lands (5) disposed at intervals (6) directly along said cutting edge, said lands (5) extending directly from said cutting edge to said rake surface, said lands (5) being spaced a predetermined distance from each other by said intervals, said lands (5) having a width inwardly from said cutting edge, which width varies along the respective cutting edges, said concave rake surface (8) reaching directly to said cutting edge at said intervals and directly to said lands (5) outside said intervals (6).

2. The throw-away insert of claim 1, wherein said rake surface has an arcuate shape in cross-section as seen at right angles to said cutting edge, and wherein an angle ($\alpha$) defined between a horizontal line through said cutting edge and a tangent to said arcuate shape varies along the cutting edge.

3. The throw-away insert of claim 2, wherein said angle ($\alpha$) between said horizontal line and said tangent is relatively larger where said lands (5) are located than where said intervals (6) are located.

4. The throw-away insert of claim 1, wherein said plurality of raised portions include a plurality of bosses (10) having substantially flat upper surfaces, disposed around the center of the insert body, and one or more projections (9) spaced a desired distance away from said cutting edge.

5. The throw-away insert of claim 1, wherein said plurality of lands are disposed symmetrically with respect to a perpendicular line drawn from the insert center to said cutting edge where said lands are formed.

* * * * *